(12) United States Patent
Harvey et al.

(10) Patent No.: US 8,216,682 B2
(45) Date of Patent: Jul. 10, 2012

(54) MOISTURE CURABLE ISOCYANATE CONTAINING ACRYLIC FORMULATION

(75) Inventors: Ty Dennis Harvey, Fort Worth, TX (US); Yuduo Zhu, Grand Prairie, TX (US)

(73) Assignee: Illinois Tool Works, Inc., Glenview, IL (US)

( * ) Notice: Subject to any disclaimer, the term of this patent is extended or adjusted under 35 U.S.C. 154(b) by 580 days.

(21) Appl. No.: 12/212,887

(22) Filed: Sep. 18, 2008

(65) Prior Publication Data

US 2009/0098388 A1   Apr. 16, 2009

Related U.S. Application Data

(60) Provisional application No. 60/979,117, filed on Oct. 11, 2007.

(51) Int. Cl.
*B32B 27/06* (2006.01)
*B32B 37/12* (2006.01)
*C08K 5/5415* (2006.01)

(52) U.S. Cl. ........ 428/429; 428/441; 428/447; 524/266; 156/329

(58) Field of Classification Search ................ 428/423.1, 428/429, 441, 447; 156/329; 524/266
See application file for complete search history.

(56) References Cited

U.S. PATENT DOCUMENTS

| | | | |
|---|---|---|---|
| 2,949,445 A | 8/1960 | Blake et al. | |
| 3,125,592 A | 3/1964 | Nevin et al. | |
| 3,297,745 A | 1/1967 | Fekete | |
| 3,560,237 A | 2/1971 | Miller | |
| 3,637,559 A | 1/1972 | de Nemours | |
| 3,759,809 A | 9/1973 | Carlick | |
| 4,303,563 A | 12/1981 | Emmons et al. | |
| 4,528,320 A | 7/1985 | Ley et al. | |
| 5,164,136 A | 11/1992 | Comert et al. | |
| 5,418,288 A * | 5/1995 | Kawasaki et al. ............... | 525/71 |

FOREIGN PATENT DOCUMENTS

| | | |
|---|---|---|
| DE | 31 31 848 | 12/1981 |
| WO | WO-2006/114420 | 2/2006 |

* cited by examiner

*Primary Examiner* — Thao T. Tran
(74) *Attorney, Agent, or Firm* — Patent Procurement Services

(57) ABSTRACT

A moisture curable acrylic formulation is provided inclusive of a majority by weight polyacrylic prepolymer. The prepolymer has an average molecular weight of between 3,000 and 6,000 grams per mole and between 2 and 4 moisture curable functional moieties of isocyanate or silane per prepolymer. A thermoplastic adhesive resin is also included within the formulation. When the prepolymer functional moieties are all silane, the thermoplastic adhesive resin is ethylene vinyl acetate resin. A silane molecule is provided within the formulation as an adhesion promoter and also affords a degree of storage stability through sacrificial reaction with water during storage. The resultant formulation achieves a shear strength of at least 10 pounds per square inch when applied to a thickness of 0.75 millimeters between a glass substrate and a vinyl article 15 minutes after application at 120° Celsius in ambient atmospheric air. The formulation is well suited for the formation of a window assembly when applied intermediate between a substrate and a window article.

17 Claims, No Drawings

MOISTURE CURABLE ISOCYANATE CONTAINING ACRYLIC FORMULATION

CROSS REFERENCE TO RELATED APPLICATIONS

This application claims priority of U.S. Provisional Patent Application Ser. No. 60/979,117 filed Oct. 11, 2007, which is incorporated herein by reference.

FIELD OF THE INVENTION

The present invention in general relates to moisture curable sealants and in particular to hydrolytic condensation of isocyanate moieties in sealant prepolymers to form sealants with attractive characteristics especially upon being warm-applied.

BACKGROUND OF THE INVENTION

An adhesive, coating, or sealant composition is selected for a particular purpose based on the final physical properties available after composition cure. These physical properties typically include tensile strength, shear strength, weathering resistance, flexibility, and in some instances transparency. Additional factors in the selection of a particular composition include not only final physical properties, but also handling properties such as precure viscosity and the rate of physical property build during cure. In a production setting rapid physical property build facilitates product throughput as components to be joined will not need to be set aside waiting for cure property buildup.

An often important physical property buildup parameter is the amount of time required for a composition to become tack free since a non-tacky composition is amenable to exposure to subsequent operations that produce debris that would otherwise contaminate a tacky composition.

A number of one part moisture curable compositions exist that provide these characteristics within a narrow range of final physical properties. Among these conventional materials are polyurethane compositions as detailed in, for example, U.S. Pat. Nos. 3,380,967 and 3,779,794; and silane terminated acrylics such as those detailed, for example, in U.S. Pat. Nos. 6,414,077 and 7,064,162. Unfortunately, the extendable range of physical properties currently attainable with existing compositions is limited.

Thus, there exists a need for moisture curable isocyanate containing formulations that afford rapid provision of a wide range of cured formulation glass transition temperatures and substrate wetting. Additionally, there exists a need for such a formulation providing rapid final physical property buildup and tolerant of being warm-applied.

SUMMARY OF THE INVENTION

A moisture curable acrylic formulation is provided inclusive of a majority by weight polyacrylic prepolymer. The prepolymer has an average molecular weight of between 3,000 and 6,000 grams per mole and between 2 and 4 moisture curable functional moieties of isocyanate or silane per prepolymer. A thermoplastic adhesive resin is also included within the formulation. When the prepolymer functional moieties are all silane, the thermoplastic adhesive resin is ethylene vinyl acetate resin. A silane molecule is provided within the formulation as an adhesion promoter and also affords a degree of storage stability through sacrificial reaction with water during storage. The resultant formulation achieves a shear strength of at least 10 pounds per square inch when applied to a thickness of 0.75 millimeters between a glass substrate and a vinyl article 15 minutes after application at 120° Celsius in ambient atmospheric air. The formulation is well suited for the formation of a window assembly when applied intermediate between a substrate and a window article.

DETAILED DESCRIPTION OF THE PREFERRED EMBODIMENTS

The present invention has utility as a moisture curable formulation operative as an adhesive, coating, or sealant. An inventive formulation has as a majority constituent an acrylic prepolymer formed by the copolymerization of a functional moiety containing acrylic monomer and an acrylic monomer lacking the reactive functional moiety (synonymously described herein as being "nonreactive" or "nonfunctionalized"). A reactive moiety containing acrylic monomer according to the present invention includes those detailed in U.S. Pat. Nos. 6,414,077 and 7,064,162; hydroxy acrylates such as 2-hydroxyethyl acrylate, 2-hydroxyethyl methacrylate, and 3-hydroxypropyl acrylate; primary amine acrylates such as 1-hydroxy-2-aminopropyl methacrylate, 1-amino-2-hydroxypropyl methacrylate, acrylamide, and 3-hydroxypropyl methacrylate; secondary amine acrylic monomers such as 2-terbutyl amino ethyl methacrylate, sulfonic acids such as 2-acrylamido-2-methyl propane sulfonic acid; epoxy acrylic monomers such as glycidyl methacrylate; isocyanate acrylic monomers such as $\alpha,\alpha$-dimethyl meta-isopropenyl benzyl isocyanate; and organic silanes such as vinyl trimethoxysilane, vinyltriethoxysilane, vinyltris(2-methoxyethoxy)silane, 3-[tris(trimethylsiloxy)silyl]propyl methacrylate, vinyl methyldimethoxy silane, vinyl methyldiethoxy silane, vinylphenyldimethoxysilane and vinyl oximino silane.

Acrylic monomers that are considered nonreactive according to the present invention are those that only include aliphatic moieties combined with acrylate or methacrylate moieties. Nonfunctionalized acrylic monomers according to the present invention illustratively include methylmethacrylate, $C_1$-$C_{16}$ alkyl acrylate, and $C_1$-$C_{16}$ alkyl methacrylate and specifically include lauryl methacrylate, methyl acrylate, ethyl acrylate, butyl acrylate, 2-ethyl hexyl acrylate, ethyl methacrylate, butyl methacrylate and 2-ethyl hexyl methacrylate.

According to the present invention, nonfunctionalized acrylic monomer is polymerized through a conventional free radical mechanism and preferably in the presence of a free radical catalyst to form a polyacrylic prepolymer, polymethacrylic prepolymer or copolymer prepolymer of multiple types of nonfunctionalized acrylic monomers. After polymerization has proceeded to a predetermined level typically to yield nonfunctionalized acrylic prepolymer segments having a molecular weight of between 3,000 and 600,000 grams per mole, and preferably between 5,000 and 400,000, then functionalized acrylic monomer is added and copolymerized to yield an acrylic prepolymer having terminal and/or pendent functional groups extending from the nonfunctionalized acrylic prepolymer backbone. Alternatively, a small percentage of a functionalized acrylic monomer typically between 0.01 and 3 mole percent relative to nonfunctionalized acrylic monomer are premixed and copolymerized by a conventional free radical mechanism and preferably in the presence of a free radical catalyst. The resultant acrylic prepolymer has functional moieties dispersed throughout the prepolymer segments. It is appreciated that regardless of the polymerization scheme, prepolymer molecular weight is readily controlled through the inclusion of a chain transfer agent such as a thiol. The degree of prepolymer functionality is typically controlled to between 2 and 6 and preferably between 2 and 4 inclusive.

Regardless of the specific functional moieties incorporated into an inventive acrylic prepolymer, the prepolymer is rendered moisture curable by subsequent reaction of the functional moieties to isocyanate moieties (—NCO) to yield an inventive polymer with moisture cure induced urea or polyurethane linkages. It is appreciated that silane moieties are moisture curable without further modification. Regardless of the reaction scheme, the resultant acrylic prepolymer is rendered moisture curable.

An amine functional moiety is converted to an isocyanate functional moiety through reaction with phosgene by a conventional process. Preferably, subsequent conversion of amine functionality to isocyanate moieties preferably includes removal of byproduct hydrochloric acid. Likewise, a hydroxyl functional moiety is also readily directly reacted to yield an isocyanate functionality or through an intermediate reaction to an amine which in turn is basis for conversion to an isocyanate group through reaction with phosgene.

An alternate cure mechanism for an inventive acrylic prepolymer is reaction of functional moieties of such a prepolymer with a polyisocyanate. As used herein, a polyisocyanate is defined to include a molecule having at least two isocyanate functionalities. Exemplary diisocyanates include toluene diisocyanate (TDI), such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), naphthalene diisocyanate (NDI), xylene diisocyanate (XDI), isophorone diisocyanate (IPDI), 3,3'-bistoluene-4,4'-diisocyanate, hexamethylene diisocyanate (HDI), hydrogenated DMI, hydrogenated XDI, and modified liquid MDI adducts, oligomeric HDI (e.g. dimer, trimer, etc.), oligomeric IPDI (e.g. dimer, trimer, etc.), naphthalene-1,5-diisocyanate, other oligomeric isocyanates, the polymeric isocyanates such as polyphenylene polymethylene isocyanate (PMDI), mixtures and derivatives thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI. Inclusion of a triisocyanate or higher degree isocyanate is appreciated to be a simple way to add functional isocyanate degree to an inventive prepolymer.

Additionally, a sulfonic functional moiety such as that obtained by incorporation of 2-acrylamido-2-methylpropane sulfonic acid into an inventive prepolymer is also amenable to a secondary reaction to yield isocyanate functionality in the prepolymer. Likewise, epoxy functionality present in an inventive prepolymer is readily reacted through a ring opening to yield a mixed hydroxyl and amine functionality subsequently reacted to yield isocyanate functionality. Epoxide ring opening to yield mixed hydroxyl and amine functionality is detailed in U.S. Pat. No. 2,949,445.

Free radical acrylate polymerization conditions are well known to the art and illustratively include charging of an autoclave with 100 parts by weight of various monomers along with 0.6 parts benzoyl peroxide as a free radical polymerization initiator, 0.8 parts dodecane thiol operative as a chain transfer agent, 70 parts by weight toluene and 30 parts by weight isopropyl alcohol. It is appreciated that by the use of a different chain transfer agent such as mercapto-ethanol not only controls prepolymer molecular weight, but also adds to the prepolymer functionality. Heating under autogenous pressure to 90° Celsius for 4 hours is suitable to induce polymerization. The resultant acrylic prepolymer solution is then optionally charged with functionalized acrylic monomer and farther reacted to incorporate functionality into the resultant prepolymer. It is appreciated that polymerization conditions are readily monitored for unreacted monomer to determine polymerization completeness.

The glass transition temperature of an inventive acrylic prepolymer is readily calculated based on a mole percentage weighted summation of the acrylic monomers from which it is derived as $$Tg \text{ prepolymer} = \sum_{1}^{n} f_n Tg_n$$

where f is the molar fraction of monomer n and $Tg_n$ is the glass transition temperature for monomer n, where $Tg_n$ and Tg prepolymer are in degrees Kelvin. In one embodiment with the majority acrylic monomer being $C_1$-$C_{16}$ alkyl acrylate with a lesser amount of methyl methacrylate and a 2-hydroxyl acrylate in an amount of between 0.01 and 3 monomer mole percent functionalized monomer results in an inventive acrylic polymer having particularly attractive sealant properties.

It is appreciated that the properties of an inventive moisture cured acrylic polymer are readily adjusted to suit a particular application. By way of example, molecular weight of prepolymer segments, degree of moisture curable functionality per prepolymer unit, prepolymer viscosity and the identity of the moisture cure bonds formed as being urea linkages, urethane linkages, or a combination thereof, as well as whether such linkages are terminal to prepolymers or pendent are all properties used to adjust the resultant acrylic polymer properties. As a result of the ability to tailor the resultant acrylic polymer properties, an inventive acrylic polymer composition is suitable for a variety of applications illustratively including sealants, adhesives, and coatings. Subsequent to cure, an inventive polymer has a moisture content typically between 0.005 and 0.1 total weight percent, and preferably between 0.02 and 0.05 total weight percent.

Such prepolymers are further detailed in a co-filed U.S. provisional application 60/979,115 having the title "Polyacrylic Moisture Curable Copolymer", the contents of which are hereby incorporated by reference.

To facilitate the manufacturing throughput by securing two substrates with an inventive formulation, the formulation is tailored to facilitate warm application. In contrast to conventional thermoset materials, an inventive formulation facilitates substrate repositioning after formulation application and prior to moisture cure. As a result, an inventive formulation is provided that has a prepolymer operative as a viscous liquid composition alone or in combination with a solvent to be suitable for extrusion application at 20° Celsius or alternatively is provided as a semisolid composition at room temperature that is applied at a temperature between 60° and 130° Celsius and affords sufficient green strength to hold substrates in relative alignment as moisture cure proceeds. It is noted that an inventive formulation if protected from water or moisture retains viscosity until exposed to atmospheric humidity that induces cure. On moisture exposure, silane functionality in an acrylic prepolymer undergoes moisture cure and likewise isocyanate functional moieties within a prepolymer moisture cure.

To facilitate the rapid build of green strength after application, an inventive formulation includes a minority by weight quantity of an adhesive thermoplastic resin. Adhesive thermoplastic resins operative herein illustratively include ethylene vinyl acetate, and polypropylene. A thermoplastic adhesive resin is present in a quantity to afford improved structural integrity and more rapid green strength building relative to a formulation containing only moisture curable prepolymer. A particularly desirable quantity of thermoplastic adhesive resin is provided such that a warm-applied inventive formulation at between 60° Celsius and 130° Celsius achieves a shear strength of at least 10 pounds per square inch (psi) when applied to a thickness of 0.75 millimeters between polyvinyl chloride and borosilicate glass planar substrates, and typically yield s a shear strength of between 12 and 15 psi. The shear strength is obtained in 15 minutes. More preferably the formulation has an open low viscosity working time of between 1 and 5 minutes to adjust an article secured to a substrate by an inventive formulation. Thermoplastic adhesive resin is typically present from 10 to 40 total weight percent of a fully moisture cured sealant. It is appreciated that the amount of thermoplastic adhesive resin present depends on factors including resin molecular weight, glass transition temperature of the acrylic prepolymer, prepolymer degree of functionality, prepolymer viscosity, and overall precured formulation viscosity. An exemplary thermoplastic adhesive resin operative herein is ethylene vinyl acetate.

Optionally, an adhesion promoter is provided to facilitate adhesion of an inventive formulation to a variety of substrates. Substrates such as aluminum and glass, as well as steel, benefit from the inclusion of an adhesion promoter. While a variety of adhesion promoters are conventional to the art and illustratively include glycols, silanes, acrylic oligomers, and tertiary amines. Preferably an adhesion promoter in an inventive formulation is a silane. A silane also provides an additional benefit of functioning as a moisture scavenger. The silanes operative herein as adhesion promoters and moisture scavenging agents illustratively include methyltrimethoxysilane, dimethyldimethoxysilane, trimethylmethoxysilane, methyltriethoxysilane, dimethyldiethoxysilane, methyltriethoxysilane, phenyltrimethoxysilane, diphenyldimethoxysilane, triphenylmethoxysilane, phenyltriethoxysilane, diphenyldiethoxysilane, vinyltriacetoxysilane, methyltri(dimethylamino)silane, methyltri(N,N-methylethylaminoxy)silane, methyltri(N-methyl-N-acetylamino)silane, methyltri(isopropenoxy)silane, vinyltrimethoxysilane, vinyltriethoxysilane, γ-methacryloxypropyltrimethoxysilane, γ-methacryloxypropylmethyldimethoxysilane, methyltriacetoxysilane, γ-glycidoxypropyltrimethoxysilane, γ-aminopropyltriethoxysilane, beta-(3,4-epoxycyclohexyl)ethyltrimethoxysilane, γ-aminopropyltrimethoxysilane, N-(2-aminoethyl)-γ-aminopropyltrimethoxysilane, N-(2-aminoethyl-γ-aminopropylmethyldimethoxysilane, N-(2-aminoethyl)aminomethyltrimethoxysilane, dimethoxymethyl-3-pyperazinopropylsilane, 3-piperazinopropyltrimethoxysilane, N-(3-triethoxysilylpropyl)urea, N-phenyl-γ-aminopropyltrimethoxysilane, and partial hydrolysis condensates of any of the above organic silanes. An adhesion promoter is typically present between 0.1 and 5 total weight percent of an inventive formulation and preferably between 1 and 3 total weight percent.

An inventive formulation optionally includes additives illustratively including water scavengers to promote storage lifetime, solvents, plasticizers, fillers, ultraviolet light stabilizers, and Theological control substances. Fillers operative in an inventive formulation illustratively include carbon black; metal oxides such as zinc oxide; and minerals such as talc, clays, silica, and silicates. Carbon black is a particularly preferred filler for use where resistance to degradation caused by ultraviolet light exposure is desired, such as for use in windshield sealants. An effective amount of filler preferably is between about 0 and 80 weight percent based upon the weight of prepolymer, and most preferably between about 20 and 60 weight percent. Solvents such as toluene, xylene, methyl ethyl ketone, acetone, ethyl acetate, and other suitable materials free of isocyanate-reactive moieties are also operative. Toluene is a preferred solvent. An effective amount of solvent preferably is between about 0 and 80 weight percent based upon the weight of prepolymer. Plasticizers such as partially hydrogenated terphenyls (e.g., "HB-40", commercially available from Monsanto Corp.), dioctyl phthalate, dibutyl phthalate, diisodecyl phthalate, or tricresyl phosphate can also be employed in compositions of the invention. Partially hydrogenated terphenyls are a preferred plasticizer. An effective amount of plasticizer preferably is between about 0 and 25 weight percent based upon the weight of prepolymer. In addition, the inventive formulation optionally contains antioxidants; pigments; UV absorbers; adhesion promoters; drying agents specifically including molecular sieves such as sodium aluminum silicate, desiccants such as zeolite, silica gel, barium oxide, or calcium oxide. For use in glass sealant formulations, it is desirable to employ an effective amount of a silane-containing primer, either as an ingredient of the sealant composition, or as a separate layer placed between the surface of the glass to be sealed and the layer of sealant, or as both an ingredient of the sealant composition and as a separate layer. Suitable silane-containing primers are described in U.S. Pat. Nos. 3,627,722 and 3,707,521. If silane-containing primer is incorporated into an inventive formulation, an effective amount of silane-containing primer preferably is between about 2.5 and 10 weight percent, based upon the weight of prepolymer. If silane-containing primer is employed as a separate primer coating, then an effective amount of such silane-containing primer in the primer coating will be an amount which affords the desired degree of bonding performance given the mode of application of the primer layer and the sealant composition to the surfaces which are to be bonded.

A hydrocarbon resin tackifier is optionally provided to increase formulation tack to add adhesive strength to a substrate. Hydrocarbon resin tackifiers operative herein illustratively include C5 Aliphatic Hydrocarbon Resins and C9 Aliphatic Hydrocarbon Resins. Typically, a hydrocarbon resin tackifier is present from 5 to 30 total weight percent of an inventive formulation.

The composition of an inventive formulation is summarized in Table 1.

TABLE 1

Inventive Formulation

| Component | Amount - Typical Total Weight Percent | Amount - Preferred Total Weight Percent |
|---|---|---|
| Polyacrylic prepolymer with functional moieties | 35-80 | 40-60 |
| Thermoplastic adhesive resin | 10-40 | 25-35 |
| Silane | 0.1-5 | 1-3 |
| Tackifier | 0-30 | 15-25 |
| Solvent | 0-20 | 5-15 |
| Filler | 0-20 | 1-10 |
| Thixotropic agent | 0-20 | 1-10 |

In use, the final sealant may provide a viscous liquid composition having sufficient solvent to provide a sufficiently low viscosity at room temperature for application; or may provide a semi-solid composition that after application at a sufficient temperature provides sufficient green strength in the setting of glass. If kept protected from water or moisture, the consistency of the sealant will remain the same until exposed to humid conditions. The sealant composition generally cures within a short period of time with atmospheric moisture, whether as a solvent containing viscous liquid or a warm applied semi-solid solvent version. The cured sealant forms a permanently resilient and pliable product with a $T_g$ in the range of from about −50° Fahrenheit to about 10° Fahrenheit. Sealants intended for exterior use are expected to encounter temperatures below 0° Celsius. As sealants may be used on interior or exterior windows, the present invention was designed and selected to form a sealant based on a polymer having a $T_g$ of between about −50 and about 10° Celsius.

The curing rate generally will be dependent on, e.g., the relative humidity, temperature, amount of solvent and the amount of cross-linking catalyst. A desirable cure rate for sealants curing at room temperature is about 5 mm thickness per day, which may be achieved with sealant compositions according to the present invention that include a catalyst. As used herein, the term "catalyst" is used to describe any free radical generator. Catalysts useful in the present invention are included in an effective amount to catalyze the reaction. The amount used generally has a correlation to the curing rate of the sealant. Examples of useful catalysts include, but are not limited to, t-butyl peroctoate, toluene, and organo-tin catalysts such as dioctyl tin dilaurate. Generally, catalysts useful in the present invention may be described as cross-linking catalysts that may add varying degrees of strength and adhesiveness to the sealant. Also, catalysts useful in the present invention may be described as an additive that is capable of accelerating cross-linking of the polymer.

While an inventive acrylic formulation is readily applied at room temperature, preferably the acrylic formulation of the present invention is applied at an elevated temperature of between 200° and 120° Celsius and preferably provides an open time of between 1 and 5 minutes. Preferably, the open time is adjusted to between 2 and 3 minutes with the formulation rapidly building green strength subsequent to the open time. An inventive formulation with these application properties is particularly well suited for a window bed backing and glazing that satisfies American Architectural Manufacturers Association (AAMA) standards for sealants.

The present invention is further detailed with respect to the following nonlimiting examples. These examples are intended to illustrate specific forms of the present invention and not intended to limit the interpreted scope of the appended claims.

Example 1

Functionalized Moisture Curable Prepolymer Synthesis 175 grams butyl acrylate (Tg −55° Celsius), 110 grams methyl acrylate (Tg 8° Celsius), 13 grams lauryl methacrylate (Tg −65° Celsius): 3 grams methyl methacrylate (Tg 105° Celsius) and 1 gram hydroxy ethylacrylate (Tg −15° Celsius) are placed in a mixing can with 1.5 grams of dodecane thiol and 0.3 gram of benzoyl peroxide and mechanically mixed for 1 minute. 100 grams of t-butyl acetate is placed in a round bottom flask and brought to reflux. The acrylate monomer mixture containing peroxide and thiol are added dropwise over a period of 3 hours and the mixture heated above 110° Celsius with mechanical stirring. An additional 0.3 grams of benzoyl peroxide is added over a period of 15 minutes to the flask followed by a subsequent hour of temperature maintenance. Then an additional 0.1 gram of benzoyl peroxide is added over a period of 5 minutes and reaction temperature maintained for an additional hour. Thereafter, 30 additional grams of solvent is added and the reaction mixture cooled to 80° Celsius with nitrogen purge being initiated. An isocyanate (toluene diisocyanate) is added to provide a stoichiometric moiety equivalent of isocyanate groups for hydroxyl groups associated with hydroxyl ethyl acrylate plus thiol moieties present in the mixture plus the amount of moisture present in the mixture. According to the synthesis, 0.016 moles of hydroxyl and thiol groups are present. The moisture content of the mixture is readily determined through Karl Fischer titration. After combining the isocyanate with the mixture and mixing for an additional 10 minutes, a dioctyl tin carboxylate catalyst is added in an amount of 0.4 grams with continued mixing for an additional hour. The resulting isocyanate terminated prepolymer has a mean molecular weight of 100,000 grams per mole and a glass transition temperature of −35° Celsius. Upon exposure to ambient moisture, the resultant isocyanate terminated prepolymer moisture cures to a polyacrylic containing urethane linkages.

To 100 parts by weight of the prepolymer is added 60 parts by weight of ethylene vinyl acetate resin, while retaining the mixture under an atmosphere of dry nitrogen. Three parts by weight of methyl trimethoxy silane, 10 parts by weight of finned silica operative as a thixotropic agent, and 35 parts by weight of tackifier are admixed along with 14 parts by weight of t-butyl acetate. After mixing to homogeneity, the resulting formulation is packed into an air-free tube. The tube is heated to 65° Celsius and applied to a borosilicate glass substrate to a bead thickness of 6.3 millimeters. A vinyl article is overlaid on the bead with the relative position of the glass substrate and vinyl article adjusted during an open time of about 2 minutes. A green strength of at least 10 psi shear is obtained in 15 minutes. The formulation is allowed to moisture cure for 24 hours and achieves a tensile strength of 116 pounds per linear inch and a linear elongation of 900% as measured by standard methods AAMA 1.1.3.3 805.2-82, AAMA 1.1.3.3 805.9-92, and ASTM D-412. The formulation is retainable within the tube for more than 6 months with exclusion of ambient air.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:
1. A moisture curable acrylic formulation comprising:
a prepolymer consisting essentially of polyacrylic prepolymer as a major component by weight having an average molecular weight of between 3,000 and 600,000 grams per mole and between 2 and 6 inclusive moisture curable functional moieties of isocyanate per prepolymer, said curable functional moieties of isocyanate extending from a nonfunctionalized acrylic prepolymer backbone and adapted to moisture cure alone to form an acrylic polymer;

a thermoplastic adhesive resin of ethylene vinyl acetate resin or polypropylene present at 10 to 40 total weight percent of the formulation;

wherein said thermoplastic adhesive resin provide a shear strength to the formulation of at least 10 pounds per square inch when applied to a thickness of 0.75 millimeters between a glass substrate and a vinyl article 15 minutes after application at 120° Celsius in ambient atmospheric air and a silane molecule.

2. The formulation of claim 1 wherein said plurality of polyacrylic prepolymers are present from 35 to 80 total weight percent of the formulation.

3. The formulation of claim 1 wherein said plurality of polyacrylic prepolymers have an average molecular weight of between 5,000 and 400,000 grams per mole and a glass transition temperature of between −50° and 25° Celsius.

4. The formulation of claim 1 further comprising a tackifier.

5. The formulation of claim 1 wherein said thermoplastic adhesive resin is ethylene vinyl acetate.

6. The formulation of claim 1 further comprising one or more additives selected from the group consisting of: a rheology control agent, fumed silica, inert filler, plasticizer, wetting agent, ultraviolet light absorber, and antioxidant.

7. The formulation of claim 1 wherein said plurality of polyacrylic prepolymers have an average of between 3 and 6 moisture curable functional isocyanate moieties on each of said plurality of polyacrylic prepolymers and a glass transition temperature of between −50° and 25° Celsius.

8. A window assembly comprising:
a window article;
a substrate; and
a layer of the formulation of claim 1 intermediate between said window article and said substrate.

9. The assembly of claim 8 wherein said substrate is a vehicle surface.

10. The assembly of claim 9 wherein the vehicle surface is selected from a group consisting of: vinyl, aluminum, and steel.

11. The assembly of claim 7 wherein the formulation has a green strength of at least 10 pounds per square inch shear on said glass within 15 minutes of formation of the assembly.

12. The assembly of claim 8 wherein the formulation comprises at least one additive selected from the group consisting of: a rheology control agent, fumed silica, inert filler, plasticizer, wetting agent, ultraviolet light absorber, and antioxidant.

13. A process for bonding articles to substrates, comprising: applying between the article and the substrate a layer of the formulation according to claim 1.

14. The process of claim 13 wherein the formulation is applied at a temperature of between 60° and 130° Celsius.

15. The process of claim 13 wherein the article is glass and the substrate is vinyl, steel, or aluminum.

16. The process of claim 13 further comprising adjusting the relative position of the article to the substrate for a time of between 1 and 5 minutes after formation of the assembly.

17. A moisture curable acrylic formulation comprising:
a prepolymer consisting essentially of polyacrylic prepolymer as a major component by weight having an average molecular weight of between 5,000 and 400,000 grams per mole and between 2 and 6 inclusive moisture curable functional moieties of isocyanate per prepolymer, said curable functional moieties of isocyanate extending from a nonfunctionalized acrylic prepolymer backbone and adapted to moisture cure alone to form an acrylic polymer;

a thermoplastic adhesive resin present at 10 to 40 total weight percent of the formulation;

wherein said thermoplastic adhesive resin provide a shear strength to the formulation of at least 10 pounds per square inch when applied to a thickness of 0.75 millimeters between a glass substrate and a vinyl article 15 minutes after application at 120° Celsius in ambient atmospheric air; and a silane molecule.

\* \* \* \* \*